April 18, 1967  E. POSS  3,315,144
CAPACITOR CHARGE REVERSING CIRCUIT
Filed Oct. 18, 1963  3 Sheets-Sheet 1
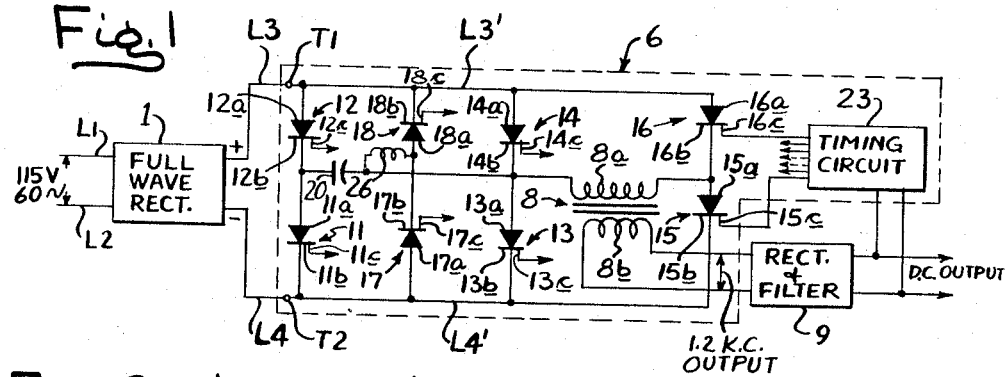
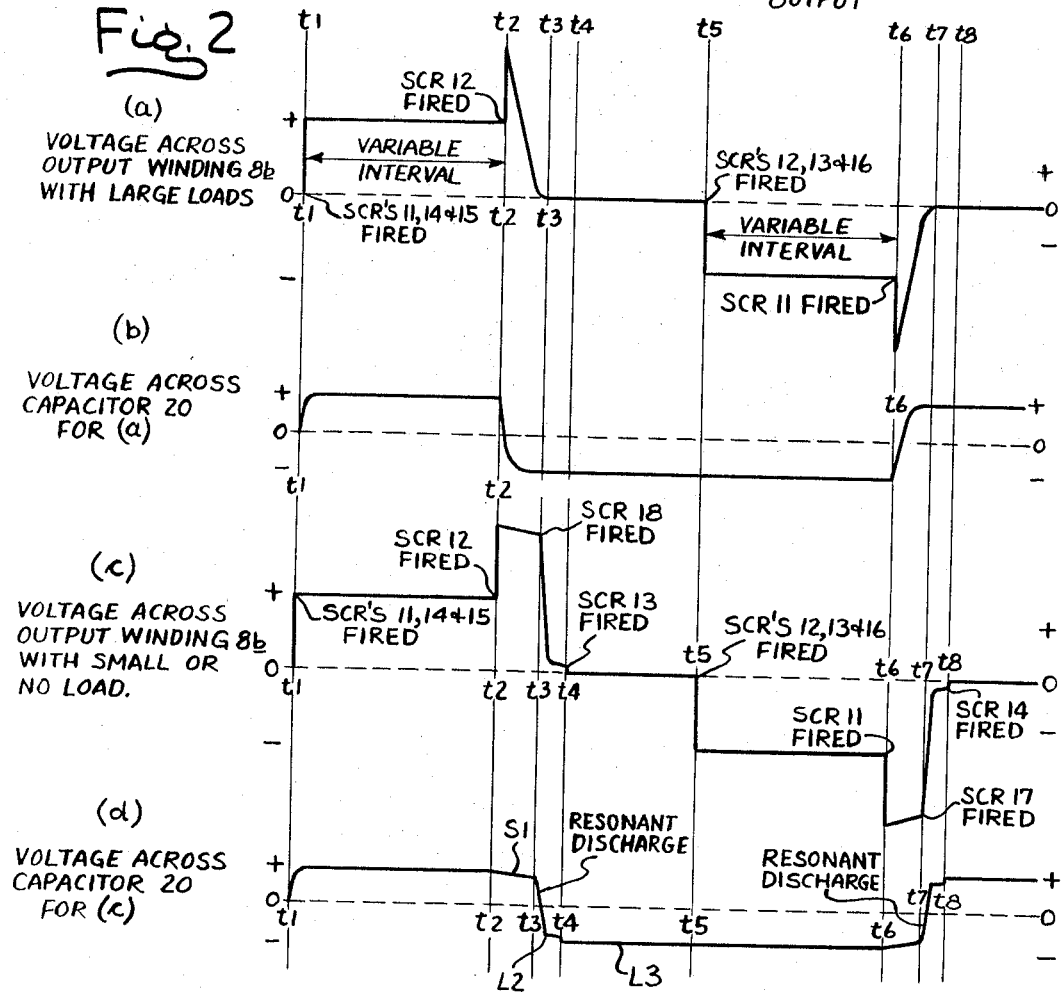
INVENTOR.
ELIASZ POSS
BY
Wallenstein Spangenberg
& Hattis
ATTYS.

April 18, 1967  E. POSS  3,315,144
CAPACITOR CHARGE REVERSING CIRCUIT
Filed Oct. 18, 1963  3 Sheets-Sheet 2

INVENTOR.
ELIASZ POSS
BY
Wallenstein, Spangenberg
& Hattis
ATTYS.

United States Patent Office 3,315,144
Patented Apr. 18, 1967

3,315,144
CAPACITOR CHARGE REVERSING CIRCUIT
Eliasz Poss, East Haven, Conn., assignor to Electronic Energy Conversion Corporation, New York, N.Y., a corporation of New York
Filed Oct. 18, 1963, Ser. No. 317,377
9 Claims. (Cl. 321—18)

This invention relates to improvements in capacitor charge reversing circuits and to applications thereof in direct current (D.C.) to alternating current (A.C.) regulated or controlled inverter circuits utilizing SCR switch devices or the like to produce variable width A.C. current pulses.

Many inverter power supply circuits have been, heretofore, developed for converting A.C. to any predetermined D.C. voltage level and maintaining that voltage level under varying A.C. supply and load conditions. It is usually desirable for such regulated power supplies to have a high operating efficiency and also, in many cases to be as compact as possible. An important development in regulated inverter circuits satisfying both of these objectives is disclosed and claimed in application Ser. No. 111,746 of Victor Wouk and Eliasz Poss, filed May 22, 1961. This circuit utilizes a D.C. to A.C. inverter utilizing SCR switch devices to produce relatively high frequency variable width approximately rectangular A.C. voltage pulses. The inverter input is connected to the output of a full wave rectifier circuit fed from a sixty (60) cycle per second commercial A.C. supply. The SCR switch devices of the D.C. to A.C. inverter chop the D.C. input thereof into the relatively high frequency rectangular A.C. pulses referred to. The A.C. current pulses are fed through the primary winding of an output transformer which increases or decreases the voltage in the secondary winding to meet the output requirements of the circuit. By stepping up the frequency of the input power in the inverter, the size and weight of the transformer is greatly reduced over comparable units of equal power handling capacities operating at normal power line frequencies.

Voltage regulation is achieved by controlling the width of the rectangular current pulses produced by the inverter. SCR switch devices lend themselves to rapid efficient switching and they are capable of carrying large currents, much larger than is feasible with transistors of comparable cost. The SCR switch devices are 3-terminal devices having anode and cathode terminals (sometimes referred to as load terminals) and a control terminal. The timing of the firing of the SCR switch devices is controlled by suitable timing circuits which feed triggering signals to the control terminals of the SCR switch devices in sequence and at a proper phase, which devices are fired provided the polarity of the voltage applied to the load terminals is in the proper (forward) direction. The conduction of a fired SCR switch device then continues independently of the voltage fed to the control terminal thereof, termination of the conduction thereof being effected by interruption of the current flow as by the feeding of a reverse or counter voltage to the load terminals thereof for a sufficient interval. In the inverter disclosed in the aforementioned application, conduction of a fired SCR switch device is terminated by the feeding of a counter voltage to the load terminals by means of a commutating capacitor which is charged to the counter voltage in a very unique and advantageous way. Most advantageously, SCR switch devices are utilized as switching means to connect the commutator capacitor to the load terminals of the particular SCR switch device to be rendered non-conductive and to reverse the charge on the capacitor so that it is useful to render another SCR switch device non-conductive during the succeeding half cycle of the inverter operation.

The problem of efficiency of operation become particularly acute at high power levels, as for example at 2 kilowatts or more. At such power levels, significant amounts of power can be lost in the process of charging and discharging the commutating capacitor. The inverter disclosed in the abovementioned application reduces these losses practically to zero under normal (high load) conditions by a circuit design which passes substantially all the energy stored in the commutating capacitor through the primary winding of the output transformer. This circuit, however, has limitations under low load conditions.

The present invention is an improvement on the basic inverter disclosed in this application in that it operates properly at high efficiency under low as well as high load conditions. One of the main difficulties in the older inverter under low load conditions is that the time constant of the capacitor discharge circuit becomes so high that the commutating capacitor does not have a chance to discharge and then recharge in the reverse direction in the short time permitted by the high frequency of operation of the inverter. The present invention enables the inverter to operate reliably and efficiently under extremely low load (or even no load) conditions as well as under normal high load conditions by the addition of only a few circuit components which enables the quick discharge and reverse charging of the commutating capacitor without significantly increasing the cost of the D.C. power supply involved or adversely affecting the efficiency of operation of the inverter.

The above-mentioned and other advantages of the invention and the various features thereof which accomplish these advantages will become apparent upon making reference to the specification to follow, the claims and the drawings wherein:

FIG. 1 illustrates a preferred D.C. power supply incorporating the unique inverter of the present invention;

FIGS. 2(a) through 2(d) show the waveforms at different portions of the inverter in FIG. 1 under both normal and low load conditions;

Figures 3, 5:
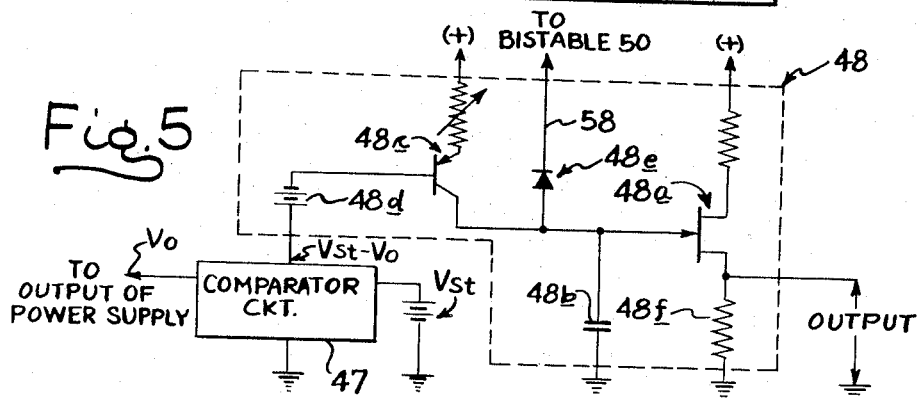
FIG. 3 is a chart indicating the sequence of the conduction (C) and non-conduction (NC) of the various SCR switch devices of the inverter under low load conditions.
FIG. 5 illustrates an exemplary circuit for a component of the timing circuit shown in block form in FIG. 4.

Referring now to FIG. 1, the power supply there shown includes a pair of input lines L1–L2 which may be connected to a 60 cycle per second commercial power supply. A rectifier circuit 1 converts the A.C. signal on input lines L1–L2 to a D.C. voltage on a pair of output lines L3 and L4, the line L3 being the positive line and the line L4 being the negative line. The lines L3 and L4 extend to input terminals T1 and T2 of an inverter circuit generally indicated by reference numeral 6. The inverter circuit 6 converts the D.C. voltage on lines L3 and L4 to a variable width A.C. voltage of rectangular wave shape at a substantially higher frequency than the power line frequency, such as 1.2 kc. or higher. This higher frequency voltage appears across the secondary or output winding 8b of an output transformer 8. The transformer has a primary winding 8a through which variable width current pulses are caused to flow in opposite directions during successive half cycles of the inverter output. The turns ratio of the windings 8a and 8b is determined in part by the desired output voltage of the power supply. The A.C. voltage across the secondary winding 8b is fed to a full wave rectifier and filter circuit 9 which converts the variable width rectangular waveform input signal thereof to D.C., the magnitude of the D.C. output of the rectifier 9 being a function both of the amplitude of the rectangular waveform A.C. input thereof and the width of the rectangular waveforms pulsations thereof.

The inverter circuit 6 illustrated utilizes four (4) main load current carrying SCR switch devices 13, 14, 15 and 16 and four (4) low current rated control SCR switch devices 11, 12, 17 and 18 serving primarily control functions to be described. As is well known, SCR switch devices (also referred to as silicon controlled rectifiers) are unidirectional current carrying devices which operate analogously to thyratron tubes. Each SCR switch device includes anode and cathode or load electrode identified in FIG. 1 by reference characters $a$ and $b$ respectively following a number designating the SCR switch device involved and a control electrode identified by the reference character $c$ following a number designating the SCR switch device involved. When the anode electrode of an SCR switch device is connected to a positive voltage and the cathode electrode is connected to a negative voltage, the feeding of a triggering signal to the control electrode thereof will effect a stable high conductive state thereof independently of the subsequent voltage conditions applied to the control electrode until the current flowing through the cathode and anode (load) terminals is interrupted in some way. This can be accomplished by feeding a voltage to be referred to as a counter voltage which opposes the applied voltage across the load terminals or by open circuiting the load current path.

The load terminals of the load current carrying SCR switch devices 13 and 14 are connected in series across busses L3'–L4' respectively connected to the positive and negative inverter input terminals T1 and T2, with the cathode electrodes 13b and 14b connected to place them nearest the negative bus L4'. The load terminals of the load current carrying SCR switch devices 15 and 16 are connected in series across the busses L3' and L4' in the same manner as the SCR switch devices 13 and 14. The primary winding 8a of the inverter output transformer 8 is connected between the points of juncture of the load terminals of the pairs of SCR switch devices 13–14 and 15–16. It is thus apparent that, when the SCR switch devices 14 and 15 are rendered simultaneously conductive, current will flow in one direction through the primary winding 8a and, when the SCR switch devices 13 and 16 are rendered simultaneously conductive, current will flow through the primary winding 8a in the opposite direction.

The means for rendering the load current carrying SCR switch devices non-conductive includes a commutating capacitor 20 which has one plate connected to the juncture of the load current carrying SCR switch devices 13 and 14 and another plate connected to the juncture of control SCR switch devices 11 and 12. The control SCR switch devices 11 and 12 are connected in series between the busses L3' and L4' in the same manner as the pairs of SCR switch devices 13–14 and 15–16. When the control SCR switch device 12 is in a conductive state, the commutating capacitor 20 is effectively connected across the load terminals of the load current carrying SCR switch device 14, and when the control SCR switch device 11 is in a conductive state the commutating capacitor is effectively connected across the load terminals of the load carrying SCR switch device 13. The capacitor 20 is charged in a manner to be described, so that firing of SCR switch device 12 alone will render the SCR switch device 14 non-conductive and so that firing of SCR switch device 11 will render the SCR switch device 13 non-conductive. The commutating capacitor 20 renders the load current carrying SCR switch device 14 non-conductive when the right plate thereof connected to the cathode electrode 14b of the load current carrying SCR switch device 14 is positive with respect to the left plate thereof connected through the control SCR switch device 12 to the anode electrode 14a. The commutating capacitor 20 renders the load current carrying SCR switch device 13 non-conductive when the right plate connected to the anode electrode 13a thereof is negative with respect to the left plate thereof connected through the control SCR switch device 11 to the cathode electrode 13b.

The commutating capacitor 20 is charged in one of two ways. One of these involves the firing of control SCR switch devices along with load current carrying SCR switch devices such as 14 and 15 at the beginning of each first half cycle of operation of the inverter circuit. When SCR switch device 11 is fired the right plate of the commutating capacitor 20 is connected to the positive bus L3' through SCR switch device 14. The left plate thereof is connected to the negative bus L4' through the SCR switch device 11. This capacitor charge circuit is an extremely low impedance circuit, and so very large peak currents are reached which result in substantial energy loss which would be undesirable if this were repeated each half cycle of operation of the circuit. However, the commutating capacitor 20 is charged in this manner only when the power is initially turned on, and thereafter the charge and discharge current of the capacitor 20 flows through the much higher impedance of the primary winding 8a of the transformer 8 where the energy which would otherwise be lost is coupled to the load. This higher impedance also limits the peak value of the currents involved and so minimizes energy loss due to the $I^2R$ losses in the conductors. As soon as the capacitor 20 becomes fully charged, the SCR switch device 11 will become non-conductive because the current path therethrough is interrupted by the capacitor 20 which does not allow any further current flow after the capacitor is fully charged. Conduction of the SCR switch devices 14 and 15 effects the feeding of current from left to right through the primary winding 8a of the inverter output transformer 8.

During the beginning of each second half cycle of operation of the inverter circuit, SCR switch devices 12, 13 and 16 are fired simultaneously. Conduction of SCR switch device 12 connects the left plate of the capacitor 20 to the positive bus L3'. The firing of SCR switch device 13 connects the right plate of the capacitor 20 to the negative bus L4'. Conduction of the SCR switch devices 13 and 16 effects the feeding of current from right to left through primary winding 8a.

Once the inverter circuit starts operation, the charging of the capacitor 20 each half cycle of operation is achieved at the same time the capacitor 20 is active in rendering one of the load current carrying rectifiers 13 or 14 non-conductive. When this occurs, the capacitor discharges through the primary winding 8a and the SCR switch devices 15 or 16 which is still conducting. Since the associated control SCR switch devices 12 or 11 is also conducting, the capacitor is, in effect, coupled between the busses L3' and L4' and so it discharges and then charges to a voltage of reverse polarity. After the capacitor fully charges to the new voltage, the current flow through the pair of SCR switch devices 12–15 or 16–11 involved is interrupted so as to render them non-conductive.

Where a relatively large load is involved representing a small effective load resistance, the time constant of the discharge and charge path of the commutating capacitor 20 is relatively small and the capacitor has no difficulty in substantially fully discharging and then recharging to a reverse voltage in the short time interval permitted for this purpose.

The high load condition of operation is best illustrated in FIGS. 2a and 2b to which reference is now made for a better understanding of the circuit operation. FIG. 2a shows the voltage across the secondary output winding 8b of transformer 8 and FIG. 2b shows the voltage across the capacitor 20. Time $t1$ is assumed to be the instant when power is initially applied to the circuit and where the capacitor 20 has not previously been charged. It is also assumed that SCR switch devices 11, 14 and 15 are fired together at time $t1$. As previously indicated, capacitor 20 is then charged (positively as shown) due to the conduction of SCR switch devices 11 and 14. Current flows through the primary winding which induces a voltage in the transformer secondary winding 8b (FIG. 2a). At time t2 when the SCR switch device 12 is fired and SCR switch device 14 is rendered non-conductive, the voltage charge on the capacitor 20 adds to the voltage on the busses L3' and L4' to produce the double voltage spike shown in FIG. 2a. Note from FIG. 2b that the capacitor 20 discharges to zero and then charges to a reverse value in a short time.

The operation of the circuit during the second half cycle starting at t5 is similar to the first half cycle just described. Thus, at the beginning of the second half cycle, SCR switch devices 13 and 16 are simultaneously fired which results in current flow through the primary winding in the opposite direction than that just described, which produces the negative portion of the voltage waveform of FIG. 2a. For reasons which are now apparent, SCR switch device 12 is also rendered conductive at time t5 solely for the purpose of ensuring that the commutating capacitor 20 is charged properly should power be turned on just prior to t5 instead of at t1. When the circuit has already been operating, the firing of the SCR switch device 12 serves no useful purpose because the capacitor 20 will have already been charged to the proper value in a manner previously explained.

It frequently occurs that a power supply must operate efficiently over widely varying loads. This is difficult to achieve under no-load or low-load conditions where the effective resistance of the load is so high that the time constant of the discharge and charge circuit of the commutating capacitor 20 is so great that the capacitor cannot fully discharge and then recharge to an opposite value without the aid of the inefficient charging of the capacitor by means of the SCR switch devices 13 and 14. The large time constant of the capacitor discharge circuit is shown by the small slope of the waveform portion between t2 and t3 in FIG. 2d. In accordance with the present invention, this problem is overcome by the addition of an inductance 26 and control SCR switch devices 17 and 18. The inductance forms a resonant circuit with the capacitor 20 at a frequency which is many times higher than the operating frequency of the inverter. In the circuit shown in the drawings, the inductance 26 is connected between the right plate of the commutating capacitor 20, which is the plate connected to the juncture of the SCR switch devices 13 and 14, and the anode electrode 18a of the control SCR switch device 18. The cathode electrode 18b of the SCR switch device 18 is connected to the positive bus L3'. The cathode electrode 17b of control SCR switch device 17 is connected to the juncture of inductance 26 and the control SCR switch device 18, and the anode electrode 17a thereof is connected to the negative bus L4'.

The control SCR switch devices 17 and 18 are respectively operative during succesive half cycles of the inverter circuit operation. As in the exemplary embodiment of the invention illustrated in the drawings, during the first half cycle of the inverter circuit the control SCR switch device 18 is fired at time t3 while the capacitor 20 has discharged only a small amount due to the long time constant of the capacitor discharge circuit. The capacitor 20 then discharges through a passive loop circuit including the inductance 26 and the SCR switch device 18 whereupon the voltage on capacitor 20 reverses quickly due to the resonant action of the loop circuit. Upon completion of one-half cycle of the resultant resonance action, current ceases in the loop circuit because the SCR switch device conducts in only one direction. This results in negligible power losses. The peak currents flowing during this condition are moderate due to the current limiting action of the inductance 26. Due to the presence of some resistive impedance in this loop circuit, some reduction in the reverse voltage built up on the capacitor will take place, which is indicated by voltage level L2 in FIG. 2d. As there shown, the capacitor charges to a voltage where the voltage on the right plate is negative and the voltage on the left plate is positive. During this resonant discharge and recharging of the capacitor 20, the energy stored in the capacitor does not pass through the transformer primary winding 8a as in the case of the discharge and charge thereof under normal high load conditions illustrated in FIGS. 2a and 2b.

The capacitor 20 is similarly resonantly discharged and charged to a reverse voltage during each second half cycle by the firing of control SCR switch device 17 at time t7 (FIG. 2d) which again places inductance 26 in a resonant loop circuit with capacitor 20.

It is significant to note that the inverter would not operate properly or efficiently if the capacitor were resonantly discharged and charged by placement of the inductance 26 in series with the power busses L3' or L4' so that the power for charging the capacitor 20 would come from the D.C. supply source. In such case, it can be shown that the voltage on the capacitor 20 would progressively build up to an extremely large magnitude, requiring expensive components which could withstand such voltage levels. The significant point about the placement of the capacitor 20 in the present invention is that it discharges resonantly through a circuit that has no source of power.

As previously indicated, the reverse charging of the capacitor 20 through the resonant loop circuit referred to will not completely charge the capacitor 20 to the desired negative level L3 indicated in FIG. 2d. With the charge on the capacitor not fully reversed to the input voltage, current will continue to flow through, for example, SCR switch devices 12 and 15, so that when the next power pulse comes along, firing SCR switch devices 12, 13 and 16, since SCR switch device 15 is still conducting, there will be a short circuit through SCR switch devices 16 and 15. Therefore, the objective is to be sure that the capacitor is fully charged so that SCR switch devices 12 and 15 will have been extinguished due to lack of current flow therethrough. This problem is overcome in each first half cycle by firing load current carrying SCR switch device 13 at time t4 which connects the right plate of the capacitor 20 to the negative bus L4', to charge the capacitor 20 fully to the negative bus voltage. Power losses are negligible in this instance because of the small degree of charging which the capacitor must undergo. The problem is overcome during each second half cycle by firing load current carrying SCR switch device 14 at time t8, which connects the right plate of capacitor 20 to positive bus L3'.

FIG. 3 is a chart which summarizes the states of the various SCR switch devices shown in FIG. 1 at the various times indicated on FIGS. 2c and 2d.

The firing of the various SCR switch devices is controlled by timing pulses fed to the control electrodes thereof from a timing circuit generally indicated by reference numeral 23. The timing circuit operation is responsive to the amplitude of the output of the power supply. A momentary drop in this output will result in a delay in the phase of the timing pulses fed to the last control electrodes of the control SCR switch devices 11 and 12 which effect turn-off of the conductive states of the load current carrying SCR switch devices 13 and 14.

Figure 4:
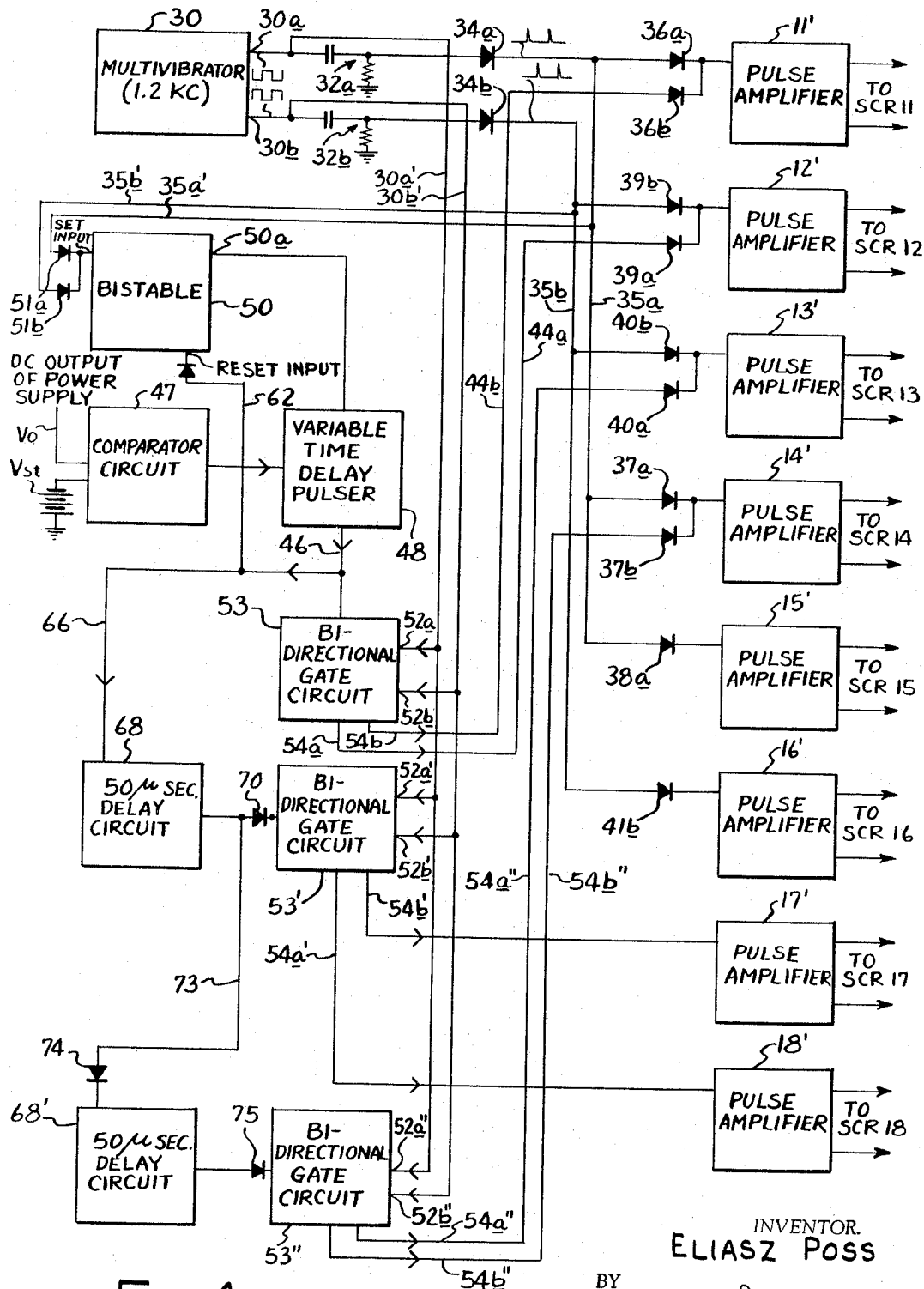
FIG. 4 is a detailed block diagram of the timing circuit portion of FIG. 1.

Refer now to FIG. 4 which illustrates in a detailed block diagram the components of an exemplary timing circuit 23. As there shown, the basic frequency of operation of the inverter circuit is controlled by a multivibrator 30 which, for example, may operate at a frequency of between 1 and 2 kilocycles. The multivibrator may comprise a pair of cross-coupled transistor stages having outputs 30a–30b where square waveforms appear which are 180° out of phase. Output line 30a is connected through a differentiating network 32a and a rectifier 34a which passes only the positive pulses coinciding with the voltage increases in the square waveform at the output 30a to a bus 35a. Output 30b is connected through a differentiating network 32b and a rectifier 34b which passes only the positive pulses coinciding with the voltage increases in the square waveform at the output 30b to a bus 35b. The positive output pulses on the busses 35a and 35b are thus 180° out of phase at the frequency of the inverter circuit. The positive pulses on the bus 35a are operative to fire those SCR switch devices which operate during each first half cycle of the inverter operation and the positive pulses on the bus 35b are operative to fire those SCR switch devices which operate during each second half cycle of the inverter operation. The inputs of pulse amplifiers 11′, 14′ and 15′ are connected through isolating rectifiers 36a, 37a and 38a to the bus 35a. The inputs of pulse amplifiers 12′, 13′ and 16′ are connected through isolating rectifiers 39b, 40b and 41b to the bus 35b. The outputs of pulse amplifiers 11′, 12′, 13′, 14′, 15′ and 16′ are respectively fed to the control electrodes of the SCR switch devices 11, 12, 13, 14, 15 and 16 to effect the firing thereof at the appropriate times t1 or t5 at the beginning of the half cycles of inverter circuit operation which coincide with the beginning of the current pulses fed through the primary winding 8a of the transformer 8.

The operation of the SCR switch devices in the periods between the start and finish of each half cycle (i.e. at t2, t3, t4, t6, t7 and t8) depends on the output conditions of the power supply and these times are related to the termination of the current pulses fed through the primary winding 8a of the transformer 8. The intervals between t2–t3–t4 and t6–t7–t8 are fixed. Only the intervals between t1–t2 and t5–t6 vary. To this end, a variable time delay pulser 48 is provided which generates pulses at the time instants t2 and t6 under control of a comparator circuit which is responsive to the output of the power supply. The comparator circuit compares the output voltage of the power supply circuit and a standard of voltage (Vst) and provides a control voltage which is a function of the difference between these voltages. Various circuits for generating a pulse whose phase depends upon the magnitude of a control voltage are well known in the art. The variable time delay pulser 48 may, for example, be a relaxation oscillator circuit utilizing a double-based diode 48a (see FIG. 5) and a capacitor 48b in the base circuit which discharges the capacitor when the double-based diode becomes conductive. The capacitor is charged through the load circuit of a transistor 48c whose base electrode is shown coupled to a biasing voltage 48d and to the output of the comparator circuit 47. The conductivity of the transistor 48c is thus dependent on the power supply output and the charge rate of the capacitor 48b varies with the conductivity of the transistor. When the voltage of the capacitor reaches the firing voltage of the double-based diode, the latter will fire to discharge the capacitor. The capacitor remains discharged due to a clamping voltage fed thereto through a diode 48e.

The charging of the capacitor 48b is initiated each half cycle by the removal of the clamping voltage which is a voltage fed from a bistable circuit 50. The clamping voltage may be a ground or negative voltage appearing at an output 50a (FIG. 4) thereof when the bistable is reset. The voltage at this output may be at the positive voltage of the supply voltage for the double-based diode 48a, or any voltage above that, when the bistable is set.

The bistable 50 is set by positive pulses appearing on branch lines 35a′–35b′ respectively connected to the pulse busses 35a and 35b, on which positive synchronizing pulses respectively appear coinciding with the beginning of each first and second half cycle of the inverter circuit operation. The branch lines 35a′ and 35b′ are connected through isolating rectifiers 51a and 51b to the set input of the bistable 50 so that each time it receives a positive pulse it will be triggered into a set state if it is then in a reset state. Thus, at the beginning of each half cycle, the bistable 50 will be in a set state enabling the capacitor 48b to charge.

A pulse is generated across a resistor 48f in the base circuit of the double-based diode 48a each time the latter is fired, the phase of the pulse being a function of the charge rate of the capacitor 48b. The pulses appearing across this resistor, which constitutes the output of the time delay pulser 48, is fed to the input of a bi-directional gate circuit 53. The gate 53 receives a control voltage from control input lines 52a and 52b which are respectively connected to branch lines 30a′ and 30b′ extending to the outputs 30a and 30b of the multivibrator 30 at which square wave voltages appear 180° out of phase. The input lines will thus receive positive voltages during alternating half cycles. A positive voltage on control input line 52a will result in the feeding of the input pulses to output line 54a and a positive voltage on control input line 52b will result in the feeding of the input pulses to output line 54b. This type of bi-directional gate circuit is a well known circuit in the art and details thereof will, therefore, not be disclosed herein.

During each first half cycle (i.e. at time t2), a pulse will thus appear on the output line 54a of gate circuit 53 which is coupled through an isolating rectifier 39a to the input of the pulse amplifier 12′ which controls the triggering of the SCR switch device 12. During each second half cycle (i.e. at time t6), a pulse will appear on the output line 54b of the gate circuit 53 which is coupled through an isolating rectifier 36b to the pulse amplifier 11′ which controls the triggering of the SCR switch device 11.

The output of the variable time delay pulser 48 is also coupled by a line 66 to the input of a delay circuit 68 which produces a positive pulse 50 microseconds after the pulse produced by the delay pulser. This positive pulse is coupled to the input of a bi-directional gate circuit 53′, which is similar to the aforementioned gate circuit 53. The bi-directional gate circuit 53′ has a control input line 52a′ connected to branch line 30a′ extending to the output 30a of the multivibrator circuit 30. The gate circuit 53′ has another input line 52b′ connected to branch line 30b′ extending to the output 30b of the multivibrator circuit 30. Thus, during each first half cycle (i.e. at time t3), the positive voltage on the input line 52a′ effects transfer of the positive pulse at the gate circuit input to an output line 54a′ extending to the pulse amplifier 18′ which controls the firing of the SCR switch device 18. During each second half cycle (i.e. time t7), the positive voltage on the input line 52b′ effects transfer of the positive pulse at the gate circuit input to the output line 54b′ connected to the pulse amplifier 17′ which controls the firing of the SCR switch device 17.

The output of the 50 microsecond delay circuit 68 is coupled through a line 73 and a rectifier 74 to the input of another delay circuit 68′, which is similar to the delay circuit 68. The delayed positive pulse output of the delay circuit 68′ is fed through a rectifier 75 to the input of a bi-directional gate circuit 53″ which is similar to the gate circuits 53′ and 53 previously described. Thus, the gate circuit 53″ has a control input line 52a″ connected to the branch line 30a′ extending to the output 30a of the multivibrator 30. The gate circuit 53″ also has an input line 52b″ connected to the branch line 30b′ extending to the output 30b of the multivibrator 30.

When a positive voltage appears on the input line 52a″ during each first half cycle, the delayed pulse fed to the input of the gate circuit 53″ at time t4 appears on an output line 54a″ connected through an isolating rectifier 40a to the input of the pulse amplifier 13′ controlling the firing of the SCR switch device 13. When a positive voltage appears on the input line 52b″ during each second half cycle, the delayed pulse fed to the input of the gate circuit 53″ at time t8 will be fed to the output line 54b″ connected through an isolating rectifier 37b to the input of the pulse amplifier 14′ controlling the firing of the SCR switch device 14.

The timing circuit 23 just described ensures that the timing intervals between each half cycle of operation of the inverter circuit are substantially identical.

It should be understood that numerous modifications may be made in the preferred form of the invention described above without deviating from the broader aspects of the invention.

What I claim as new and desire to protect by Letters Patent of the United States is:

1. A D.C. to A.C. inverter circuit comprising: a pair of D.C. input terminals, a pair of output terminals, a number of unidirectional switch devices at least two of which are main load current carrying devices and each being triggerable into a stable high conductive state where current flows readily only in one direction and which remains in the conductive state until a D.C. counter voltage opposing such current flow is applied thereto, means connecting a first one of said main load current carrying switch devices in series with said pair of D.C. input terminals and said pair of output terminals for passing current in one direction therethrough, means connecting the second one of said main load current carrying switch devices in series with said pair of D.C. input terminals and said pair of output terminals for passing current in the opposite direction therethrough, means for periodically alternately triggering said main current carrying switch devices into a conductive state for causing current to pass through said pair of output terminals in opposite directions to produce an A.C. voltage, and means for alternately stopping the conduction of said main current carrying switch devices comprising capacitor means, first switch means for coupling said capacitor means when charged in one direction to said D.C. counter voltage across one of said main load current carrying switch devices when it is in a conductive state for stopping the conduction thereof and second switch means for coupling the capacitor means when charged in the opposite direction to said D.C. counter voltage across the other main load current carrying switch device when it is in a conductive state for stopping the conduction thereof, and means for reversing the charge on said capacitor means comprising inductance and switch means forming with said capacitor a loop circuit excluding said D.C. input terminals and where the inductance and capacitor form a passive transient resonant circuit at a frequency substantially in excess of the frequency of the A.C. produced by the inverter circuit, and switch control means for rendering the last-mentioned switch means conductive to effect a transient resonant discharge and then a reverse charging of the capacitor means, the switch means becoming non-conductive during the first half cycle of the transient to terminate the transient before the voltage across the capacitor again reverses.

2. A D.C. to A.C. inverter circuit comprising: a pair of D.C. input terminals, a pair of output terminals, a number of unidirectional switch devices at least two of which are main load current carrying devices and each being triggerable into a stable high conductive state where current flows readily only in one direction and which remains in the conductive state until a D.C. counter voltage opposing such current flow is applied thereto, means connecting a first one of said main load current carrying switch devices in series with said pair of D.C. input terminals and said pair of output terminals for passing current in one direction through said pair of output terminals, means connecting the second one of said main load current carrying switch devices in series with said pair of D.C. input terminals and said pair of output terminals for passing current in the opposite direction therethrough, means for periodically alternately triggering said main current carrying switch devices into a conductive state for causing current to pass through said pair of output terminals in opposite directions to produce an A.C. voltage, and means for alternately stopping the conduction of said main current carrying switch devices comprising capacitor means, first switch means for coupling said capacitor means when charged in one direction to said D.C. counter voltage simultaneously across one of said main load current carrying switch devices when it is in a conductive state for stopping the conduction thereof and in series circuit relation with said pair of output terminals and said D.C. input terminals for, under relatively high load conditions, effecting first the discharge thereof and then the reverse charging of the capacitor means through said pair of output terminals, and second switch means for coupling the capacitor means when charged in the opposite direction to said D.C. counter voltage simultaneously across the other main load current carrying switch device when it is in a conductive state for stopping the conduction thereof and in series circuit relation with said pair of output terminals and said D.C. input terminals for effecting, under relatively high load conditions, first the discharge thereof and then the reverse charging of the capacitor means through said pair of output terminals, and means for accelerating the speed of discharge of said capacitor means under relatively low load conditions comprising inductance means and switch means forming with said capacitor a loop circuit excluding said D.C. input terminals, the inductance and capacitor forming a passive transient resonant circuit at a frequency substantially in excess of the frequency of the A.C. produced by the inverter circuit, and switch control means for rendering the last-mentioned switch means conductive at an instant subsequent to the time the capacitor means would have substantially fully reversed its charge under relatively high load conditions, to effect a transient resonant discharge and then a reverse charging of the capacitor means, the switch means becoming non-conductive during the first half cycle of the transient to terminate the transient before the voltage across the capacitor again reverses.

3. A regulated D.C. to A.C. inverter circuit comprising: a pair of D.C. input terminals, a pair of output terminals, at least eight unidirectional switch devices, each having a pair of load terminals and a control terminal, each triggerable by a control voltage on said control terminal into a high conductive state where current flows readily and in one direction therethrough and which remains in the conductive state until a D.C. counter voltage opposing such current flow is applied to said load terminals thereof, four of said switch devices being main load current carrying switch devices and the other devices being primarily control switch devices, means coupling said pair of output terminals in series between load terminals of a first (1M) and a second (2M) one of said main load current carrying switch devices and the remotest load terminals thereof respectively to said pair of D.C. input terminals for effecting current flow in one direction through said pair of output terminals when the switch devices are in their conductive state, means coupling said primary winding means in series between load terminals of a third (3M) and fourth (4M) one of said main load current carrying switch devices and the remotest load terminals thereof respectively to said pair of D.C. input terminals for effecting current flow in the other direction to said pair of output terminals when the latter switch devices are in their conductive states, a capacitor having one of its terminals coupled to the load terminals of the pair (1M and 4M) of main load carrying switch devices which are connected to the same one of said pair of output terminals, means connecting a first (1C) one of said control switch devices between the other terminal of said capacitor and one of said D.C. input terminals for coupling a forward counter voltage stored on said capacitor across the load terminals of the first (1M) main load current carrying switch device to terminate the conductive state thereof and first to discharge the capacitor and then to charge said capacitor to a reverse counter voltage, means connecting a second (2C) one of said control switch devices between said other terminal of said capacitor and the other of said D.C. input terminal for coupling said reverse counter voltage stored on said capacitor across the load terminals of the fourth (4M) main load current carrying switch device to terminate the conductive state thereof and first to discharge and then to charge said capacitor to said former counter voltage, an inductance for forming a resonant circuit with said capacitor at a frequency greatly in excess of the A.C. output frequency of the inverter circuit, means coupling said inductance and the load terminals of a third (3C) one of said control switch devices in series across the load terminals of said first (1C) control switch device for rapidly discharging said forward counter voltage on the capacitor by a passive transient resonant discharge action effected by said inductance when said third (3C) control switch device is in a conductive state, means coupling said inductance and the load terminals of a fourth (4C) one of said control switch devices in series across the load terminals of said second (2C) control switch device for rapidly discharging said reverse counter voltage on the capacitor by a transient resonant discharge action effected by said inductance when said fourth (4C) control switch device is in a conductive state, and means for repeatedly feeding triggering signals to the control terminals of said switch devices in the following repetitive sequence:

| Time | 1M | 2M | 3M | 4M | 1C | 2C | 3C | 4C |
|------|----|----|----|----|----|----|----|-----|
| ta   | X  | X  |    |    |    | X  |    |     |
| tb   |    |    |    |    |    | X  |    |     |
| tc   |    |    |    |    |    |    |    | X   |
| td   |    |    | X  | X  | X  |    |    |     |
| te   |    |    |    |    |    | X  |    |     |
| tf   |    |    |    |    |    |    |    | X   | where *ta, tb, tc, td, te,* and *tf* are sequentially related instants of time in the order given and "X" indicates that the switch device involved is triggered into a conductive state at the instant involved.

4. The inverter circuit of claim 3 wherein there is provided regulating means responsive to the output of the inverter circuit for varying the spacing between *ta* and *tb* and between *td* and *te*.

5. A regulated D.C. to A.C. inverter circuit comprising: a pair of D.C. input terminals, a pair of output terminals, at least eight unidirectional switch devices, each having a pair of load terminals and a control terminal, each triggerable by a control voltage on said control terminal into a high conductive state where current flows readily only in one direction therethrough and which remains in the conductive state until a D.C. counter voltage opposing such current flow is applied to said load terminals thereof, four of said switch devices being main load current carrying switch devices and the other devices being primarily control switch devices, means coupling said pair of output terminals in series between load terminals of a first (1M) and a second (2M) one of said main load current carrying switch devices and the remotest load terminals thereof respectively to said pair of D.C. input terminals for effecting current flow in one direction through said pair of output terminals when the switch devices are in their conductive states, means coupling said pair of output terminals in series between load terminals of a third (3M) and fourth (4M) one of said main load current carrying switch devices and the remotest load terminals thereof respectively to said pair of D.C. input terminals for effecting current flow in the other direction through said pair of output terminals when the latter switch devices are in their conductive states, a capacitor having one of its terminals coupled to the load terminals of a pair (1M and 4M) of main load carrying switch devices which are connected to the same one of said pair of output terminals, means connecting a first (1C) one of said control switch devices between the other terminal of said capacitor and one of said D.C. input terminals for coupling a forward counter voltage stored on said capacitor across the load terminals of the first (1M) main load current carrying switch device to terminate the conductive state thereof and first to discharge the capacitor and then to charge said capacitor to a reverse counter voltage, means connecting a second (2C) one of said control switch devices between said other terminal of said capacitor and the other of said D.C. input terminal for coupling said reverse counter voltage stored on said capacitor across the load terminals of the fourth (4M) main load current carrying switch devices to terminate the conductive state thereof and first to discharge and then to charge said capacitor to said former counter voltage, an inductance for forming a resonant circuit with said capacitor at a frequency greatly in excess of the A.C. output frequency of the inverter circuit, means coupling said inductance and the load terminals of a third (3C) one of said control switch devices in series across the load terminals of said first (1C) control switch device for rapidly discharging said forward counter voltage on the capacitor by a passive transient resonant discharge action effected by said inductance when said third (3C) control switch device is in a conductive state, means coupling said inductance and the load terminals of a fourth (4C) one of said control switch devices in series across the load terminals of said second (2C) control switch device for rapidly discharging said reverse counter voltage on the capacitor by a transient resonant discharge action effected by said inductance when said fourth (4C) control switch device is in a conductive state, and means for repeatedly feeding triggering signals to the control terminals of said switch devices in the following repetitive sequence:

| Time | 1M | 2M | 3M | 4M | 1C | 2C | 3C | 4C |
|------|----|----|----|----|----|----|----|-----|
| t1   | X  | X  |    |    |    | X  |    |     |
| t2   |    |    |    |    | X  |    |    |     |
| t3   |    |    |    |    |    |    | X  |     |
| t4   |    |    |    | X  | X  | X  |    |     |
| t5   |    |    | X  |    |    |    |    |     |
| t6   |    |    |    |    |    | X  |    |     |
| t7   |    |    |    |    |    |    |    | X   |
| t8   | X  |    |    |    |    |    |    |     | where *t1, t2, t3, t4, t5, t6, t7* and *t8* are sequentially related instants of time in the order given and "X" indicates that the switch device involved is triggered into a conductive state at the instant involved.

6. The inverter circuit of claim 5 wherein there is provided regulating means responsive to the output of the inverter circuit for varying the intervals between *t1* and *t2* and between *t5* and *t6*.

7. In combination, a first and a second D.C. input terminal across which a D.C. voltage of a given polarity is connected, a capacitor charged to a given voltage, the capacitor having a first and a second plate across which the charge voltage on the capacitor appears, load means, a first device to be controlled by said capacitor when said given voltage is connected thereto, a second device to be controlled by said capacitor when said given voltage is fed thereto, first switching means for alternately coupling said first and second plates of said capacitor first to said first device to control the same and respectively between said first and second D.C. input terminals and said load device where the charge on the capacitor is initially in voltage aiding relationship with the D.C. voltage on said D.C. input terminals and the capacitor normally discharges through said load means and then charges in a reverse direction to the voltage on said D.C. input terminals, and then to said second device to control the same and respectively between said second and first D.C. input terminals and said load device where the charge on the capacitor is initially in voltage aiding relationship with the D.C. voltage on said D.C. input terminals and the capacitor normally discharges through said load means and then charges in a reverse direction to the voltage on said D.C. input terminals, and auxiliary means for accelerating the discharge and reverse charging of said capacitor when the load means is of such a value that the time constant of the capacitor charge and discharge circuit becomes large relative to the operating rate of said switching means, said auxiliary means including inductance means for forming a resonant circuit with said capacitor at a frequency greatly in excess of the operating rate of said first switching means, unidirectional switching means coupling said inductance means and said capacitor together into a loop circuit excluding said D.C. input terminals to form a first passive transient resonant circuit where the capacitor resonantly discharges from a charge in one direction and charges in the opposite direction, the unidirectional switch means becoming non-conductive during the first half cycle of the transient to terminate the same before the charge on the capacitor again reverses, and unidirectional switching means coupling said inductance means and said capacitor together into a loop circuit excluding said D.C. input terminals which forms a second passive transient resonant circuit where the capacitor resonantly discharges from a charge in said opposite direction and charges in said one direction, the unidirectional switch means becoming non-conductive during the first half cycle of the transient to terminate the same before the charge on the capacitor again reverses.

8. In a circuit including a first and a second D.C. input terminal across which a D.C. voltage of a given polarity is connected, a capacitor charged to a given voltage, the capacitor having a first and a second plate across which the charge voltage on the capacitor appears, a first device to be controlled by said capacitor when said given voltage is connected thereto, a second device to be controlled by said capacitor when said given voltage is fed thereto, first switching means for alternately coupling said first and second plates of said capacitor first to said first device to control the same and respectively between said first and second D.C. input terminals where the charge on the capacitor is initially in voltage aiding relationship with the D.C. voltage on said D.C. input terminals and the capacitor normally discharges and then charges in a reverse direction to the voltage on said D.C. input terminals, and then to said second device to control the same and respectively between said second and first D.C. input terminals where the charge on the capacitor is initially in voltage aiding relationship with the D.C. voltage on said D.C. input terminals and the capacitor normally discharges and then charges in a reverse direction to the voltage on said D.C. input terminals, auxiliary means for accelerating the discharge and reverse charging of said capacitor, said auxiliary means including inductance means for forming a resonant circuit with said capacitor at a frequency greatly in excess of the operating rate of said first switching means, unidirectional switching means coupling said inductance means and said capacitor together into a loop circuit excluding said D.C. input terminals to form a first passive transient resonant circuit where the capacitor resonantly discharges from a charge in one direction and charges in the opposite direction, the unidirectional switch means becoming non-conductive during the first half cycle of the transient to terminate the same before the charge on the capacitor again reverses, and unidirectional switching means coupling said inductance means and said capacitor together into a loop circuit excluding said D.C. input terminals which forms a second passive transient resonant circuit where the capacitor resonantly discharges from a charge in said opposite direction and charges in said one direction, the unidirectional switch means becoming non-conductive during the first half cycle of the transient to terminate the same before the charge on the capacitor again reverses.

9. In combination, a capacitor charged to a given voltage, the capacitor having a first and a second plate across which the charge voltage on the capacitor appears, a pair of power terminals across which a source of direct current voltage is connected, a load, means normally coupling said capacitor through said load to said pair of terminals to discharge the capacitor through the load, and means for momentarily acceleratnig the discharge and reverse charging of said capacitor when said load includes a relatively high resistance, said means comprising inductance means for forming a resonant circuit with said capacitor, and means including unidirectional switching means for coupling said inductance means and said capacitor together into a passive transient resonant loop circuit isolated from at least one of said power terminals where the capacitor resonantly discharges from a charge thereon in one direction and charges in the opposite direction, the unidirectional switch means becoming non-conductive during the first half cycle of the transient to terminate the same before the charge on the capacitor again reverses.

References Cited by the Examiner

UNITED STATES PATENTS

| 3,207,974 | 9/1965 | McMurray | 321—45 |
| 3,222,587 | 12/1965 | Lichowsky | 321—45 X |

JOHN F. COUCH, *Primary Examiner.*

W. H. BEHA, *Assistant Examiner.*